US005524086A

United States Patent [19]
Kiyuna et al.

[11] Patent Number: 5,524,086
[45] Date of Patent: Jun. 4, 1996

[54] DIPOLE PARAMETER ESTIMATION METHOD AND APPARATUS

[75] Inventors: Tomoharu Kiyuna; Tetsuji Tanigawa; Kamjio Ken'Ichi, all of Tokyo, Japan

[73] Assignee: NEC Corporation, Tokyo, Japan

[21] Appl. No.: 242,084

[22] Filed: May 13, 1994

[30] Foreign Application Priority Data

May 14, 1993 [JP] Japan .................................. 5-112564

[51] Int. Cl.⁶ ........................................................ G06T 1/40
[52] U.S. Cl. ............................ 364/527; 395/23; 395/902; 128/653.1
[58] Field of Search ............................... 364/527, 413.06, 364/413.13; 128/653.1, 731; 395/23, 21, 902

[56] References Cited

U.S. PATENT DOCUMENTS

| | | | |
|---|---|---|---|
| 4,600,883 | 7/1986 | Egli et al. ................................ | 324/207 |
| 4,949,725 | 8/1990 | Ravis et al. .............................. | 128/731 |
| 5,086,479 | 2/1992 | Takenaga et al. ........................ | 382/14 |
| 5,092,343 | 3/1992 | Spitzer et al. ............................ | 128/733 |
| 5,136,242 | 8/1992 | Abraham-Fuchs ....................... | 324/244 |
| 5,182,794 | 1/1993 | Gasperi et al. ........................... | 395/23 |
| 5,218,529 | 6/1993 | Meyer et al. ....................... | 364/413.01 |
| 5,239,474 | 8/1993 | Eaton, Jr. et al. ....................... | 364/449 |
| 5,247,606 | 9/1993 | Tam ......................................... | 395/24 |
| 5,263,488 | 11/1993 | Van Veen et al. ....................... | 128/731 |
| 5,264,793 | 11/1993 | Lo et al. .............................. | 324/207.13 |
| 5,269,325 | 12/1993 | Robinson et al. .................... | 128/653.1 |
| 5,280,792 | 1/1994 | Leong et al. ............................. | 128/702 |
| 5,307,807 | 5/1994 | Valdès Sosa et al. ................ | 128/653.1 |
| 5,355,434 | 10/1994 | Yoneda et al. ............................. | 395/23 |
| 5,361,774 | 11/1994 | Yamazaki et al. ....................... | 128/731 |
| 5,417,211 | 5/1995 | Araham-Fuchs et al. ............ | 128/653.1 |

OTHER PUBLICATIONS

Lippe et al., "Frequency Domain Localization of Intra Cerbral Dipole Sources", Nov. 1994.
He et al., "Electric Dipole Tracing in the Brain by Means of the Boundary Element Method and its Accuracy", IEEE Transactions on Biomedical Engineering, vol. BME-34, No. 6, pp. 408-414 (Jun. 1987).
Seklhara et al., "Maximum-Likelihood Estimation of Current-Dipole Parameters for Data Obtained Using Multichannel Magnetometer", IEEE Transactions on Biomedical Engineering, vol. 39, No. 6. pp. 558-562 (1992).

*Primary Examiner*—Emanuel T. Voeltz
*Assistant Examiner*—Patrick Assouad
*Attorney, Agent, or Firm*—Foley & Lardner

[57] ABSTRACT

A trained neural network is used, for estimating the number, positions or moments of one or more dipoles which are assumed as sources of the electromagnetic field distribution based upon an electromagnetic field distribution of a living body or an object. At least either one of the dipole number, positions and moments or more than two of their combination is referred to as dipole parameters.

5 Claims, 6 Drawing Sheets

DIPOLE PARAMETER ESTIMATION METHOD AND APPARATUS

BACKGROUND OF THE INVENTION

This invention relates to a dipole parameter estimation apparatus, which receives as input an electromagnetic field distribution generated on a living body or an object due to electric activity in the living body or the object and assumes the presence of one or more dipoles as sources of the electromagnetic field in the living body or the object to estimate the number, positions or moments of the assumed dipoles.

Heretofore, there has been the following method of estimating positions and moments of dipoles in the living body or the object from an electromagnetic field distribution generated on the living body or the object.

First, a dipole or dipoles are assumed in the living body or the object, and an electromagnetic field distribution generated by the dipole or dipoles at point of measurement set on the surface of the living body or the object is calculated. As an error function between the calculated value $\phi_i^{(c)}$ of the electromagnetic field distribution generated at an i-th measurement point, obtained as a result of calculation, and the measured value $\phi_i^{(m)}$ of the electromagnetic field distribution, for the squared-error r is calculated as:

$$r = \frac{1}{2} \sum_i [\phi_i^{(m)} - \phi_i^{(c)}]^2 \quad (1)$$

If r is greater than a predetermined reference value, the positions and moments of the dipoles are corrected by using an optimizing method based on numerical analysis, typically a simplex method, so as to reduce the value of r. If positions and moments of the dipoles that correspond to an r value smaller than the reference value are obtained, they are made to be the estimated values of the positions and moments of the dipoles. This method is detailed in Bin He et al., Electric Dipole Tracing in the Brain by Means of the Boundary Element Method and Its Accuracy, IEEE Transactions on Biomedical Engineering, Vol. BME-34, No. 6, June 1987, hereinafter referred to as "Literature 1".

In the above method, however, the method of setting the initial parameters such as the number, positions and moments of dipoles at the start of the calculation, is ambiguous, and depending on the initial values erroneous estimation of dipole positions result. In addition, in the above method it is necessary to repeatedly execute calculation many times until obtaining the final dipole positions and moments. Nevertheless, when the shape of the living body is taken into consideration, the calculation of the electromagnetic field distribution is complicated. Therefore, enormous time was required in obtaining the estimated values. Further, with a plurality of dipoles, the estimation requires double the time in the case of a single dipole, and also the error function has the increased number of minimum points. Therefore, in many cases the result of estimation was erroneous.

SUMMARY OF THE INVENTION

An object of the present invention is therefore to provide a dipole estimation apparatus, which is capable of high speed, highly accuracy dipole estimation by taking the shape of the living body or object into consideration even in cases where there are a plurality of dipoles that are assumed.

According to one aspect of the present invention, a trained neural network is used for estimating the number, positions or moments of one or more dipoles which are assumed as sources of the electromagnetic field distribution based upon an electromagnetic field distribution of a living body or an object. Hereinafter, either the dipole number, position, or moment, or any combination of these will be referred to as dipole parameters.

According to another aspect of the present invention, the neural network is preliminarily given training data describing the relationship between electromagnetic field distribution and dipole parameters of the dipole or dipoles as the source or sources of the electromagnetic field distribution. Hereafter, this process will be referred to as "learning" which means making corrections of weights of the neural network such that the network can correctly output, in response to the input of an electromagnetic field distribution, dipole parameters of the dipole or dipoles as the source or sources of that electromagnetic field distribution. Once the learning has been completed, its result is reflected on the weights of the neural network, and the calculations that are executed in the actual estimation are only forward calculations for obtaining the output of the neural network. Thus, according to the present invention, the estimation of dipole parameters can be done at high speed even where there are a plurality of dipoles that are assumed. Further, by using training data containing noise for the training by the neural network, dipole parameter estimation which is robust against noise is made possible. Further the dipole parameters that are estimated with the neural network may be combined as the initial parameters with the simplex method or similar optimization method based on numerical analysis. Doing so permits more accurate estimation of the dipole parameters by taking the outer shape of the living body into consideration. Using the estimation value obtained in the neural network the initial parameters, a value close to the true dipole parameters has already been obtained. Thus, calculation may be repeatedly executed a reduced number of times until obtaining the true dipole parameters. High speed dipole parameter estimation is thus possible.

Other objects and features will be clarified from the following description with reference to attached drawings.

PREFERRED EMBODIMENTS OF THE INVENTION

Figure 1:
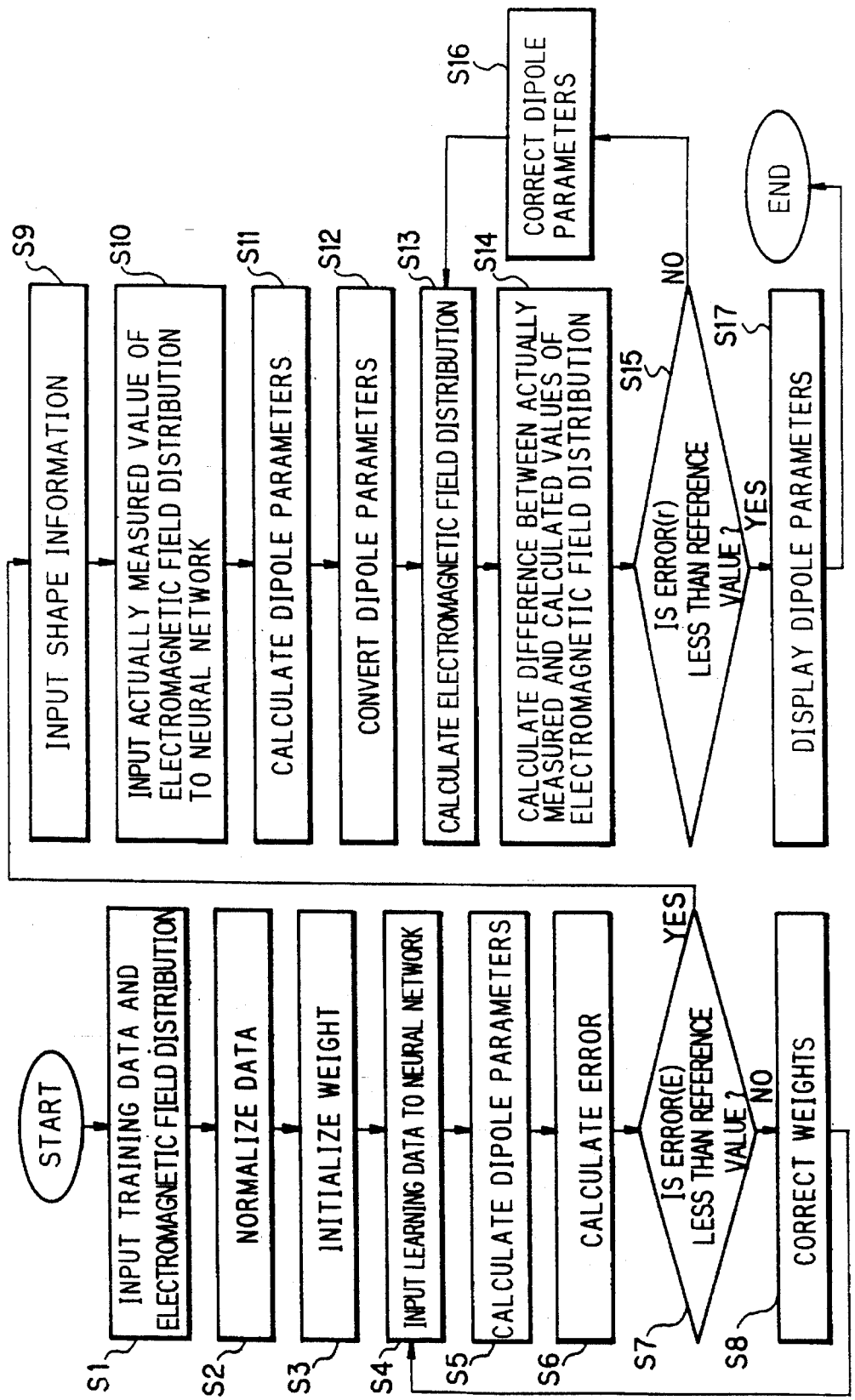
FIG. 1 is a flow chart for explaining a dipole parameter estimation method embodying the first embodiment of the present invention.

FIG. 1 is a flow chart for explaining a dipole parameter estimation method embodying the first invention. This embodiment is hereinafter referred to as first embodiment. In the following description it is assumed that the human brain has a single dipole produced therein and that it is intended to estimate, from the electromagnetic field distribution on the scalp, the number of dipoles, three position coordinate components of the dipole and three moment components of the dipole. Further, hereinafter the number, three position coordinate components and three moment components of dipole are collectively referred to as dipole parameters.

In step 1, input training data that was used for the learning by the neural network and measurement value of the electromagnetic field distribution on the scalp. The training data comprises the dipole parameters and the calculated value of the electromagnetic field distribution at each measurement point on the scalp when the dipole is produced in the brain. The electromagnetic field distribution is calculated from the dipole parameters as follows. In the following description, a head model is assumed, which is a conductive sphere with radius R and having a homogeneous conductivity. A method of calculating the potential generated on the surface of the sphere will be described. A coordinate is taken with the coordinate origin at the center of the sphere. When a dipole with its moment components $(M_t, O, M_r)$ is present at distance r from the coordinate origin of the z axis, the potential $(R, \theta, \psi)$ on the spherical surface at a specified point $(R, \theta, \psi)$ thereof is given as:

$$\phi(R,\theta,\phi) = \sum_{n=1}^{\infty} \frac{1}{4\pi\sigma R^2} \frac{2n+1}{n} \left(\frac{r}{R}\right)^{n-1} [nM_r Y_{n0}^0(\theta,\phi) + M_t Y_{n0}^1(\theta,\phi)]. \quad (2)$$

where $\sigma$ is the conductivity of the sphere, $Y_{n\alpha}^m(\theta,\psi)$ is a spherical harmonic function defined as:

$$Y_{n\alpha}^m(\theta,\phi) = \sqrt{\frac{2n+1}{2\pi} \frac{1}{1+\delta_{0m}} \frac{(n-m)!}{(n+m)!}} P_n^m(\cos\theta) \times \begin{cases} \cos m\phi & \alpha = 0 \\ \sin m\phi & \alpha = 1 \end{cases} \quad (3)$$

$P_n^m(X)$ is the Legendre's associated function, and $\delta_{ij}$ is a Kronecker's symbol defined as:

$$\delta_{ij} = \begin{cases} 1 & i=j \\ 0 & i \neq j \end{cases} \quad (4)$$

The formula (2) represents the potential in cases when the dipole is on the z axis with zero on y axis component of moment. With a dipole at any position, the potential can be obtained by formula (2) through coordinate transformation. Where there is a plurality of dipoles, the potentials that are generated by the individual dipoles may be simply added together.

The calculated value of the electromagnetic field distribution may be used as the training data either directly or by adding noise. The electromagnetic field distribution $\phi_i^{(L)'}$ with added noise is given, for instance, as:

$$\phi_i^{(L)'} = \phi_i^{(L)} + \eta_i \quad (5)$$

where $\phi_i$ is the calculated value of the electromagnetic field distribution at an i-th measurement point on the scalp, and $\eta_i$ is the added noise, which is given by using a random number. The superscript L indicates that the electromagnetic field distribution is used for the training data. In many cases, the electromagnetic field distribution measured on the scalp contains noise. Thus, by having the neural network train the data containing noise, it is possible to realize a dipole parameter estimation apparatus which is robust against noise.

The training data will now be described. The training data is produced prior to the learning in the following way. As the head model, the above homogeneously conductive sphere, for instance, is set. It is assumed that n dipoles are present in the sphere, with the i-th dipole at a position given as $(x_i, y_i, z_i)$ and with a moment given as $(Mx_i, My_i, Mz_i)$. At this time, the electromagnetic field distribution produced by these dipoles on the spherical surface at a j-th point thereon is written as $\phi_j$. Where there are k electromagnetic field distribution measurement points, a single piece of training data comprises the number, positions and moments of these dipoles and electromagnetic field distributions $(n, x_1, y_1, z_1, Mx_1, My_1, Mz_1, \ldots, x_n, y_n, z_n, Mx_1, My_1, Mz_n, \phi_1, \ldots, \phi_k)$. Such training data is prepared in an amount of, for instance 1,000 to 10,000 pieces for various numbers, positions and moments of dipoles, and it is stored in a magnetic fixed disk or similar storage device. While the above head model is a conductive sphere with a homogeneous conductivity, it is also possible to use a three layer concentric sphere model comprising three conductor layers having different conductivities in view of the fact that the brain, the cranium and the scalp have different conductivities or to use a model having the same shape as the shape of the actual head. The head model and the method of the electromagnetic field distribution calculation are detailed in James P. Ary et al., Location of Sources of Evoked Scalp Potentials: Corrections for Skull and Scalp Thicknesses, IEEE Transactions on Biomedical Engineering, Vol. BME-28, No. 6, June 1981, hereinafter referred to as "Literature 2".

In step 2, the training data and also the measured electromagnetic field distribution value are normalized. The normalization is done, for instance, as follows. The calculated value of the electromagnetic field distribution at the i-th measurement point is written as $\phi_i^{(L)}$. At this time, the normalized electromagnetic field distribution data $\phi_i^{(N)}$ is defined as:

$$\phi_i^{(N)} = a \times \frac{\phi_i^{(L)}}{\max|\phi|} \quad (6)$$

In this formula, max $|\phi|$ represents the electromagnetic field distribution value having the maximum absolute value among all the training data, and a is a normalization constant, which is appropriately 0.8, for instance but may be a different positive number. The input value is normalized in that if the input data has an excessive value, it makes the training difficult. Thus, a limitation is imposed on the maximum input value to permit more efficient execution of the training. Among the dipole parameters, the number of dipoles is normalized, for instance, as follows.

$$N = a \times \frac{N_0}{\max N_0} \quad (7)$$

where $N_o$ is the actual number, max $N_o$ is the maximum available number, N is the normalized dipole number, and a is a real number satisfying $1>a>0$. Of the dipole parameters, the position coordinates are normalized as follows. In the case of the x coordinate of the position, the normalized x coordinate x is defined as:

$$x = a \times \frac{x_0}{\max|x_0|} \quad (8)$$

where $x_0$ is the actual x coordinate value, max $|x_0|$ is the maximum value of $|x_0|$, and a is a real number satisfying $1>a>0$. The other position coordinates and the three moment components are normalized likewise. The above formula defining the normalization is not restrictive, and any formula may be used so long as the value is less than unity.

In step 3, the weights of the neural network are initialized using random numbers or the like.

In step 4, the electromagnetic field distribution data in the training data is supplied to the input layer of the neural network.

Figure 3:
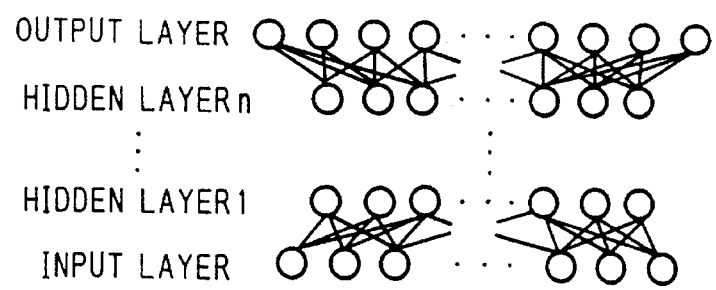
FIG. 3 shows a neural network in the embodiment.
Figure 4:
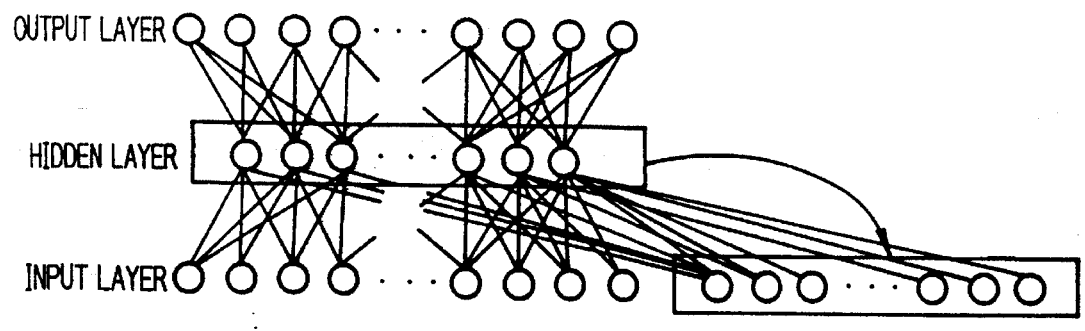
FIG. 4 shows a neural network having recurrent neural network structure.

In step 5, the dipole parameters are calculated using the neural network. FIG. 3 generally shows the neural network. As shown, it comprises three different kinds of layers, i.e., an input layer, an output layer and one or more hidden layers. In each layer, process unit systems called units 240 are provided. Each unit 240 receives input from units in the input layer side adjacent layer and provides output to units in the output layer side adjacent layer. The input/output relation of each unit can be defined as:

$$h_i^{(l)} = \sum_j W_{ij}^{(l)} v_j^{(l-1)} + \theta_i^{(l)} \quad (9)$$

$$v_j^{(l)} = g(h_j^{(l)}) \quad (10)$$

$$g(x) = \frac{1}{1 + e^{-x}} \quad (11)$$

where h is the input to the unit, v is the output from the unit, and $\theta$ is a threshold value of the unit. The superscript represents the number of layers counted from the input layer. The subscript represents the unit number in each layer. $W_{ij}^{(1)}$ shows the weights between the j-th unit in the (l−1)-th layer and the i-th unit in the l-th layer, and g(x) is an input/output response function. When calculations are executed orderly from the input layer to the output layer, an output can be finally obtained from the output layer. This output is the dipole parameter calculated by the neural network. As the response function, it is possible to use tanh(x) in lieu of the formula (11), and it is possible to use other functions. The above neural network in this embodiment shown in FIG. 3 has a structure which is free from feedback. However, the method in this embodiment can be used for dipole parameter estimation in cases where the neural network has a recurrent type network structure as shown in FIG. 4, in which the hidden or output layer provides feedback to layers existing in the input layer side or the own layer other than the output layer side adjacent layer.

Figure 5:
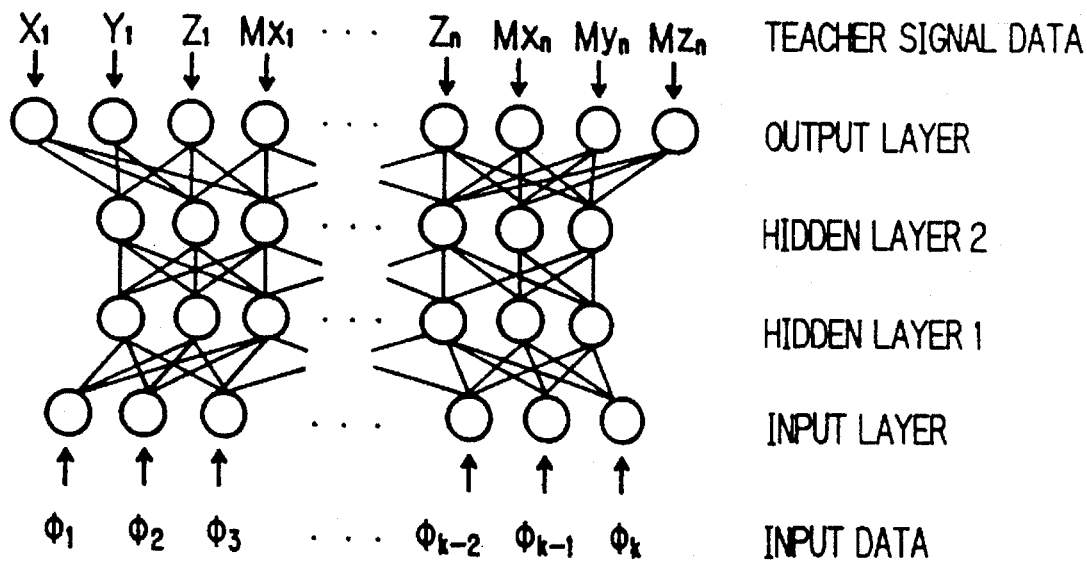
FIGS. 5 to 7 show examples of providing target output signal data.
Figure 6:
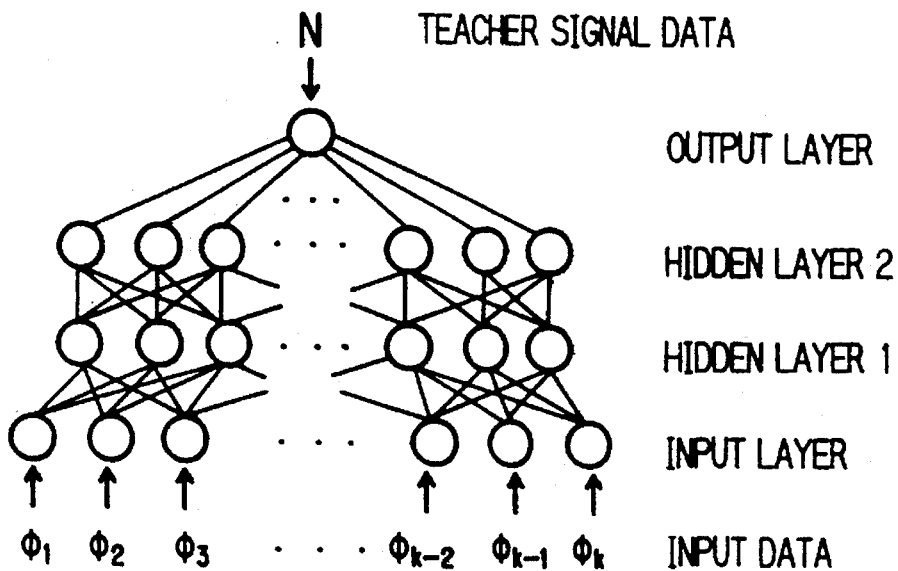
Figure 7:
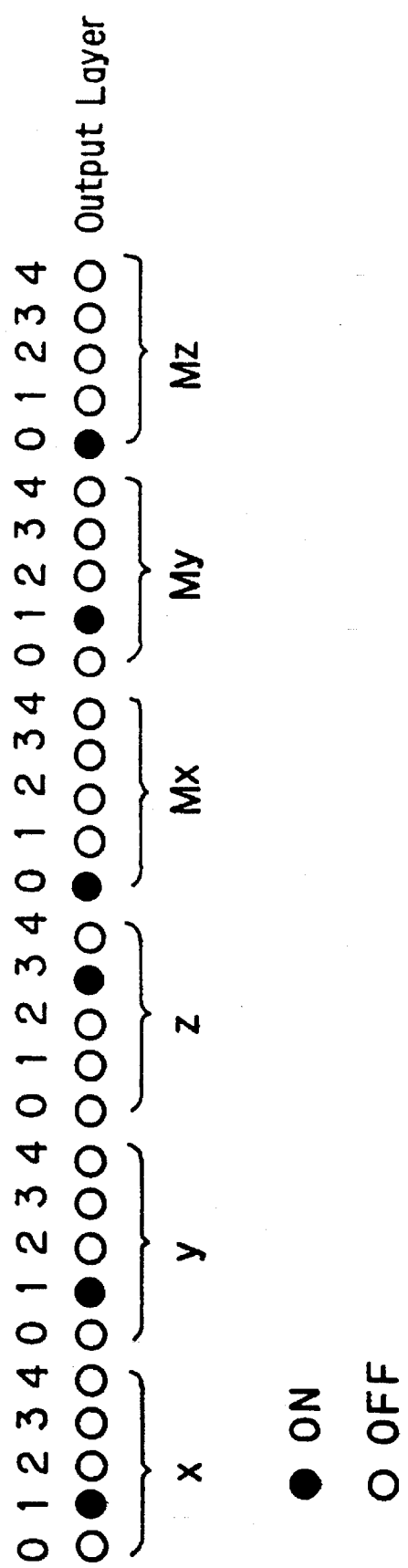
Figure 8:
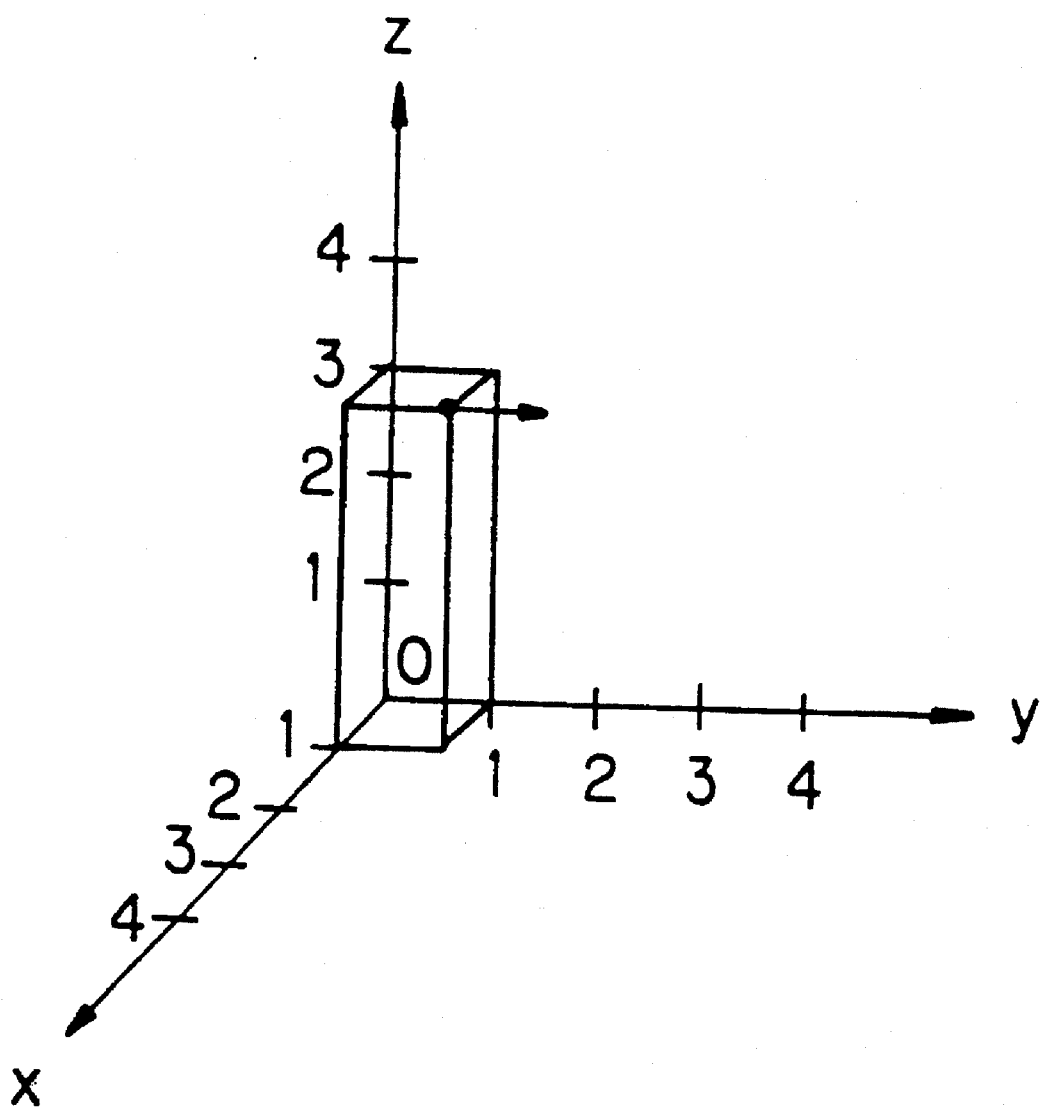
FIG. 8 shows an example of the representation of the position of the dipole and the moment components.

In step 6, the difference between the dipole parameters calculated by the neural network and the dipole parameters in the training data is calculated. This difference is hereinafter referred to as error E. The error E is defined using, for instance, a squared-error as:

$$E = \frac{1}{2} \sum_i (\sigma_i - \tau_i)^2 \quad (12)$$

where $\sigma_i$ is the output from the i-th unit in the output layer, and $\tau_i$ is the desired output from that unit. The error E need not be the squared-error so long as it is a non-negative value function to be zero when all $\sigma_i$ and $\tau_i$ coincide. The desired output of the neural network is hereinafter referred to as a target output. As the target output, the number, positions or moments of dipoles corresponding to the supplied potential distribution data may be used, but it is also possible to use other data that represent dipole features. FIGS. 5 to 7 show examples of providing target output data. In the example of FIG. 5, electromagnetic field data $\phi_j$ (j=1, . . . , k) obtained by measurement at k measurement points is provided as input data, and there are n dipoles. Represented by $x_i$, $y_i$ and $z_i$ (i=1, . . . , n) are normalized x, y and z coordinates at the i-th dipole position, and represented by $Mx_i$, $My_i$ and $Mz_i$ (i=1, . . . , n) are x, y and z coordinates at the i-th dipole moment. In the example of FIG. 6, the target output is provided for dipole number estimation. FIG. 7 shows an example of the target output, in which the position and moment of dipole are represented by the on/off state of units. FIG. 7 shows only units in the output layer, and no other layer is shown. In this case, the position and moment may be expressed by making the position coordinates and moment components discrete and turning on the units corresponding to these values while turning off the other units. The on/off state of units may be expressed by numerical values "1" and "0", but it is also possible to use other forms of expression. For example, the expression of the unit state as shown in FIG. 7 may be used for a dipole (shown by arrow mark) in FIG. 8 with the position coordinates given as (1, 1, 3) (cm) and the moment components given as (0, 1, 0) ($\mu$A·m). In FIG. 7, "on" units are shown by black circles, and "off" units are shown by white circles. While in the example of FIG. 7 there is only a single dipole, where there are a plurality of dipoles similar expression may be made by turning on units corresponding to the position coordinates and moment components of these dipoles. Further, where a plurality of dipoles are present as a group with a certain spread in an area, the expression is obtainable by turning on all the units corresponding to that area. In FIG. 7 the coordinates are made discrete for each 1 cm and also for each moment of 1 $\mu$A·m, but it is possible to make expression in a further sub-divided fashion. Further, while the example of FIG. 7 uses the Descartes coordinate system, it is possible to use as well other coordinate systems, such as a polar coordinate system or a cylindrical coordinate system.

In step 7, a check is done as to whether the error E is less than a predetermined reference value. If it is less than the reference value, the routine Goes to step 9. Otherwise, the routine Goes to step 8.

In step 8, the weights are corrected such as to reduce the error E. The weights are corrected by using error back propagation training and the like. A specific method of error correction using the error back propagation training is detailed in D. E. Rumelhart et al. Parallel Distributed Processing, Vol. 1, MIT press, pp. 318–362, 1986, hereinafter referred to as "Literature 3".

In step 9, the three-dimensional shape of the head is measured, and shape information is stored. The shape information means the coordinates of the three-dimensional shape of the head surface and the coordinates of the measurement point. The head shape is measured by, for instance, a method, in which two-dimensional position coordinates of the head profile are measured from Xray CT pictures of the head picked up in a plurality of sections or MRI pictures and combining the two-dimensional coordinates of the head profile measured in each section. In this way, the three-dimensional shape of the head is measured. It is possible to directly measure the three-dimensional coordinates of the head by using a three-dimensional position measurement apparatus utilizing a magnetic sensor.

In step 10, the measured value of electromagnetic field distribution on the scalp at each point thereof is supplied to the neural network.

In step 11, the dipole parameters are calculated from the measured value of electromagnetic field distribution by using the neural network. The method of calculation is the same as in step 5.

In step 12, the dipole parameters calculated in the neural network are converted. This is done in that the dipole parameters that are estimated in the neural network has been normalized by the method described in step 2 so that it is necessary to multiply the data by a normalization constant to obtain the actual dipole parameters. For example, in the case of the x coordinate of the dipole position, the actual x coordinate value $x_0$ is obtained from the calculated value x from the neural network by the following calculation.

$$x_0 = max|x| \times x/a. \quad (13)$$

Similar calculation is done for other dipole parameters.

In step 13, the electromagnetic field distribution produced by dipole on the scalp at each measurement point thereof, is calculated using the shape information input in step 9 and the dipole parameters obtained in step 12.

In step 14, the difference between the measured value of the electromagnetic field distribution and the calculated value of the electromagnetic field distribution obtained from the estimated value of dipole parameters are calculated. This difference is referred to as error r. The error r is defined using the squared-error as:

$$r = \frac{1}{2} \sum_i [\phi_i^{(m)} - \phi_i^{(c)}]^2 \quad (14)$$

where $\phi_i^m$ is the electromagnetic field distribution measured at the i-th measurement point on the scalp, and $\phi_i^{(c)}$ is the value of the electromagnetic field distribution at the i-th measurement point calculated from the estimated value of the dipole parameters. The error r need not be the squared-error so long as it is a function taking a non-negative value such as zero when all $\phi_i^{(m)}$ and $\phi_i^{(c)}$ coincide.

In step 15, a check is done as to whether the error r is less than a predetermined reference value. If it is less than the reference value, the routine goes to step 17. If it is greater than the reference value, the routine goes to step 16.

In step 16, the dipole parameters are corrected such as reducing the value of r between the actual measurement of the electromagnetic field distribution and the value thereof calculated from the estimated value of the dipole parameters. The correction of the dipole parameters may be made by using a squared-error minimizing method or a simplex method. The squared-error minimizing method and simplex method are detailed in, for instance, Hiroshi Konno & Hirosi Yamashita, Non-linear Planning Processes, Nikka Giren Publishing Inc., hereinafter referred to as "Literature 4".

In step 17, the dipole parameters are displayed. As the method of the dipole parameter display, there are one, in which the number, three position coordinate components and three moment components of dipoles are numerically displayed, and one, in which the dipole is displayed with a directed line segment together with three-dimensional coordinate axes. Of course, it is possible to use other methods.

Further, if the training by the neural network has been preliminarily completed and adequate weights are stored in a fixed magnetic disk or a similar storage device, it is possible to dispense with the above steps 3 to 8.

Figure 2:
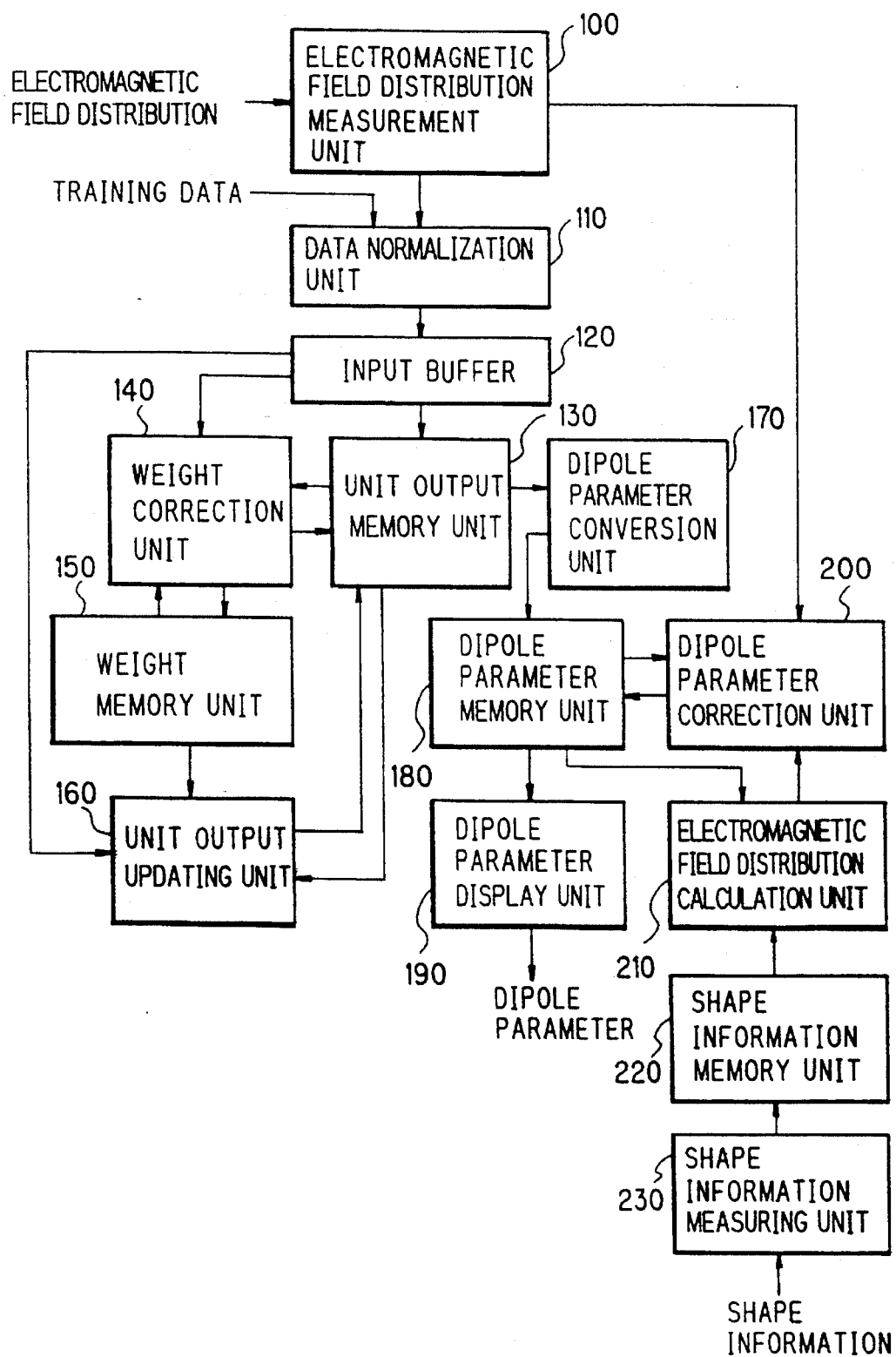
FIG. 2 is a block diagram showing an apparatus embodying the second embodiment of the present invention.

FIG. 2 is a block diagram showing an apparatus embodying the second invention. This embodiment is referred to as a second embodiment.

In this second embodiment, an electromagnetic field distribution measurement unit 100 measures the electromagnetic field distribution Generated on the scalp at a plurality of measurement points thereon and feeds data thus obtained to a data normalization unit 110. The electromagnetic field distribution measurement unit 100 may be realized by using, for instance, an electroencephalogram meter manufactured by NEC San-ei Instruments Ltd. or a magnetic flux measurement apparatus using a SQUID sensor.

The data normalization unit 110 normalizes the supplied training data and the electromagnetic field distribution data from the electromagnetic field distribution measurement unit 100 and provides the resultant normalized data to an input buffer 120 to be held. The normalization is executed by the method described before in connection with step 2 in the previous first embodiment. The data normalization unit 110 may be realized by using, for instance, a personal computer in "PC-9800" series manufactured by NEC Corporation, an engineering work station "EWS4800" manufactured by NEC Corporation, etc.

The input buffer 120 receives and stores the training data and the measured value of electromagnetic field distribution.

The input buffer 120 is required to have a large capacity and be capable of high speed reading and writing of data. It may be realized by using a magnetic disk device, a semiconductor memory device, an optical magnetic disk device, etc.

A unit output memory unit 130 receives and stores the measured value of the electromagnetic field distribution and the training data from the input buffer 120. Further, the unit output memory unit 130 receives and stores an unit output from an unit output updating unit 160. When the unit output memory unit 130 receives a weight correction end signal from a weight correction unit 140, the unit output memory unit 130 supplies dipole parameters calculated by the neural network to a dipole parameter conversion unit 170. The unit output memory unit 130 may be realized by using the magnetic disk device, the semiconductor memory device, etc.

The weight correction unit 140 receives the target output from the input buffer 120, the unit output from the unit output memory unit 130 and the weight data from a weight memory unit 150 and derives the difference between the output value of the neural network and the target output. Then the weight correction unit 140 calculates corrected values of the weights by error back propagation training and updates the weights that are stored in the weight memory unit 150.

When the error between the output value of the neural network and the target output becomes less than a reference value, for instance $10^{-3}$, the weight correction unit 140 feeds a weight correction end signal to the unit output memory unit 130. A specific method of updating is detailed in Literature 3. The weight correction unit 140 may be realized by using a personal neuroboard "Neuro-07" in "PC-9800" series manufactured by NEC Corporation, the engineering work station "EWS4800" manufactured by NEC Corporation, etc.

The weight memory unit 150 stores the weights among the individual units of the neural network. The weight memory unit 150 is referred by the unit output updating unit 160 and weight correction unit 140 and used for the calculation of the sum of the inputs to the units of the neural network and also the calculation of weight correction amounts at the time of the training with the teacher. Further, the weight correction unit 140 updates the stored contents in the weight memory unit 150. The weight memory unit 150 may be realized by using, for instance, the magnetic disk device, the semiconductor memory device, etc.

The unit output updating unit 160 receives the training data from the input buffer 120, the weights from the weight memory unit 150 and the individual unit outputs from the unit output memory unit 130 and calculates the output value of each unit by the method described before in connection with step 5 in the first embodiment. The calculated output values are supplied to and stored in the unit output memory unit 130. The unit output updating unit 160 may be realized by using, for instance, the personal neuroboard "Neuro-07" in "PC-9800" series manufactured by NEC Corporation, the engineering work station "EWS4800" manufactured by NEC Corporation, etc.

The dipole parameter conversion unit 170 receives normalized dipole parameters calculated in the neural network from the unit output memory unit 130 and converts the received parameters into actual dipole parameters by using the method described earlier in connection with step 12 in the first embodiment. The dipole parameter conversion unit 170 may be realized by using, for instance, the personal computer in "PC-9800" series manufactured by NEC Corporation, the engineering work station "EWS4800" manufactured by NEC Corporation, etc.

The dipole parameter memory unit 180 receives and stores dipole parameters from the dipole parameter conversion unit 170. Also, when the dipole parameter memory unit 180 receives a dipole parameter correction end signal from a dipole parameter correction unit 200, it feeds dipole parameters to a dipole parameter display unit 190. The dipole parameter memory unit 180 may be realized by using the personal computer in "PC-9800" series manufactured by NEC Corporation, the magnetic disk device, the semiconductor memory device, etc.

The dipole parameter display unit 190 receives and displays the dipole parameters stored in the dipole parameter memory unit 180. As a specific method of display may be used one described before in connection with step 17 in the first embodiment. The dipole parameter display unit 190 may be realized by using, for instance, the personal computer in "PC-9800" series manufactured by NEC Corporation, the engineering work station "EWS4800" manufactured by NEC Corporation, a printer "PC-PR602PS" manufactured by NEC Corporation, etc.

The dipole parameter correction unit 200 receives the actually measured value of the electromagnetic field distribution from the electromagnetic distribution measurement unit 100, and the electromagnetic field distribution value calculated on the basis of the dipole parameters calculated in the neural network from an electromagnetic field distribution calculation unit 210, calculates the error between the actually measured value and calculated value of the electromagnetic field distribution and corrects the dipole parameters. As a specific method of dipole parameter correction may be used one described before in connection with step 16 in the first embodiment. When the error becomes less than a predetermined reference value, the dipole parameter correction unit 200 feeds a dipole parameter correction end signal to the dipole parameter memory unit 180. The dipole parameter correction unit 200 may be realized by using the engineering work station "EWS4800" manufactured by NEC Corporation etc.

The electromagnetic field distribution calculation unit 210 receives the dipole parameters from the dipole parameter memory unit 180 and shape information from the shape information memory unit 220, and calculates the electromagnetic field distribution generated on the individual points of the head surface on the basis of the dipole parameters. The electromagnetic field distribution calculation unit 210 may be realized by using the personal computer in "PC-9800" series manufactured by NEC Corporation, the engineering work station "EWS4800" manufactured by NEC Corporation, etc.

A shape information memory unit 220 receives and stores shape information from a shape information measuring unit 230. The shape information memory unit 220 may be realized by using, for instance, the magnetic disk device, the semiconductor memory device, etc.

The shape information measuring unit 230 obtains measured head shape information and feeds the measured shape information to the shape information memory unit 220. A specific method of obtaining the measured head shape is one as described before in connection with step 9 in the first embodiment. The shape information measuring unit 230 may be realized by using, for instance, the digitizer, the personal computer in "PC-9800" series manufactured by NEC Corporation, the engineering work station "EWS4800" manufactured by NEC Corporation, a three-dimensional position measurement apparatus utilizing a magnetic conversion technique, provided by POLHEMUS Inc. in U.S.A.

While the above embodiments were described in connection with a case of outputting dipole parameters about a single dipole from on-scalp electromagnetic field distribution data, but dipole parameter estimation is possible in a similar way in case where a plurality of dipoles are present. In addition, not only from the electromagnetic field distribution on the scalp, but also from the electromagnetic distribution on any object of dipole parameters is obtainable in a similar way.

According to the present invention, high speed estimation of the number, positions and moments of source dipole is obtainable from the electromagnetic field distribution on a living body or an object. In addition, where there are a plurality of dipoles, high speed estimation of the number, positions and moments of the dipoles is obtainable in the same way as in the case where a single dipole is present.

What is claimed is:

1. A method for detecting dipole parameters by carrying out a learning operation of a neural network having at least a memory, an input layer composed of plural input nodes, an output layer composed of plural output nodes, and one or more hidden layers composed of plural hidden nodes, said input nodes, said hidden nodes and said output nodes being operatively coupled with each other using a plurality of connection weights, said method comprising the steps of:

a) sensing an electromagnetic field distribution imparted by an object under analysis while being subjected to an electromagnetic field;

b) storing training data in a memory, said training data including a number of dipoles, positions of the dipoles and moments of the dipoles and an electromagnetic field distribution generated by the dipoles;

c) inputting the sensed electromagnetic field distribution of the object into the neural network;

d) storing said sensed electromagnetic field distribution in the memory;

e) sensing a shape of the object and storing the shape in a shape information memory;

f) applying said training data to the node of said neural network, said neural network outputing training output data at the input node of the neural network corresponding to said training data;

g) determining a first difference between said training data and said training output data;

h) changing said connection weights and repeating steps c) to g) until said first difference is less than a first predetermined reference value and storing said changed connection weights in a weight memory unit;

i) applying said sensed electromagnetic field distribution to the input node of said neural network, said neural network outputing sensed output data at the output node of the neural network corresponding to predicted dipole parameters of said sensed electromagnetic field distribution;

j) calculating an electromagnetic field distribution based on the dipole parameters of the sensed output data;

k) determining a second difference between said sensed electromagnetic field distribution and said calculated electromagnetic field distribution;

l) changing the dipole parameters of the sensed output data and repeating steps j) and k) until said second difference is less than a second predetermined reference value; and m) displaying the dipole parameters as dipole parameters of the object on a dipole parameter display unit.

2. An apparatus for detecting dipole parameters of an object, comprising:

an electromagnetic field distribution measuring unit for measuring an electromagnetic field distribution of the object;

a data normalization unit for receiving training data and the measured electromagnetic field distribution from said electromagnetic field distribution measuring unit and normalizing the received training data and the measured electromagnetic field distribution;

an input buffer for receiving and storing the normalized training data and the normalized measured electromagnetic field distribution from said data normalization unit;

a unit output memory unit for receiving and storing the normalized training data and the normalized measured electromagnetic field distribution from said input buffer;

a weight memory unit for storing weights in individual layers of a neural network comprising an input layer, an output layer and one or more hidden layers;

a weight correction unit for receiving the normalized training data output from said input buffer, the normalized measured electromagnetic field distribution from said unit output memory unit and the weights from said weight memory unit, and for correcting the stored weights;

an output updating unit for receiving the normalized training data and the normalized measured electromagnetic field distribution, output data from said unit output memory unit and the weights from said weight memory unit, and for updating the received output;

a dipole parameter conversion unit for receiving normalized data corresponding to a number, positions and moments of dipoles from said output memory unit and converting the received normalized data into original values;

a dipole parameter memory unit for receiving and storing the normalized data corresponding to the number, positions and moments of dipoles output from said dipole parameter conversion unit;

a shape information measuring unit for measuring a shape of the object;

a shape information memory unit for storing shape information obtained by measurement in said shape information measuring unit;

an electromagnetic field distribution calculation unit for receiving the normalized data corresponding to the number, positions and moments of dipoles output from said dipole parameter memory unit and the measured shape information output from said shape information memory unit and calculating electromagnetic field distribution;

a dipole parameter display unit for receiving data corresponding to the number, positions and moments of dipoles from said dipole parameter memory unit and displaying at least either one of the number, positions and moments of dipoles or more than two of their combination; and a dipole parameter correction unit for receiving data corresponding to the number, positions and moments of dipoles from said dipole parameter memory unit, the calculated magnetic field distribution from said electromagnetic field distribution calculation unit and the measured electromagnetic field distribution from said electromagnetic field distribution measuring unit, and for correcting the number, positions and moments of dipoles to reduce the difference between the calculated and measured electromagnetic field distribution.

3. A method for estimating dipole parameters by assuming that a dipole or dipoles are present in a living body as a source or sources of electromagnetic field distribution on the living body from the measured electromagnetic field distribution, said method comprising the steps of:

reading training data used for learning by a neural network and a measurement value of an electromagnetic field distribution at a plurality of measurement points on a scalp, said training data being dipole parameters and a calculated value of the electromagnetic field distribution at each of said measurement points on the scalp when the dipole is present in a brain;

normalizing the training data and the measured value of electromagnetic field distribution;

initializing weights of the neural network using random numbers;

supplying the calculated electromagnetic field distribution in the training data to an input layer of the neural network;

determining the dipole parameters using the neural network;

determining a first difference between the dipole parameters determined by the neural network and the dipole parameters in the training data;

comparing the first difference with a predetermined reference value;

correcting the weights to reduce the first difference;

measuring a three-dimensional shape of the head of the living body;

supplying the measured value of electromagnetic field distribution on the scalp at each of the measurement points thereof to the neural network;

determining dipole parameters from the measured value of electromagnetic field distribution by using the neural network;

converting the dipole parameters determined by the neural network to obtain actual dipole parameters;

determining the electromagnetic field distribution produced by the dipole on the scalp at each of said measurement points thereof by using the measured shape and the actual dipole parameters obtained;

determining a second difference between the measured value of the electromagnetic field distribution and the calculated electromagnetic field distribution obtained from the dipole parameters;

determining whether the second difference is less than a predetermined reference value;

correcting the determined dipole parameters by reducing the mean square difference between the actual measurement of the electromagnetic field distribution and the value thereof calculated from the determined dipole parameters; and displaying the corrected dipole parameters.

4. A method for detecting dipole parameters of an object comprising the steps of:

determining, in an electromagnetic field distribution measuring unit, an electromagnetic field on an object;

receiving, in a data normalization unit, training data and measured electromagnetic field distribution from said electromagnetic field distribution measuring unit;

normalizing the received training data and measured electromagnetic field distribution;

storing, in an input buffer, the normalized training data and normalized measured electromagnetic field distribution from said data normalization unit;

storing, in a unit output memory unit, the normalized training data and normalized measured electromagnetic field distribution from said input buffer;

storing, in a weight memory unit, weights in individual layers of a neural network comprising an input layer, an output layer and one or more hidden layers;

receiving, in a weight correction unit, the normalized training data from said input buffer, the normalized measured electromagnetic field distribution from said unit output memory unit and the weights from said weight memory unit and correcting the received weights;

receiving, in an output updating unit, the normalized training data and normalized measured electromagnetic field distribution, the output data from said unit output memory unit and the weights from said weight memory unit and updating the received output;

receiving, in a dipole parameter conversion unit, data corresponding to a normalized number, positions and moments of dipoles from said output memory unit and converting the received data into original values;

storing, in a dipole parameter memory unit, data corresponding to the number, positions and moments of dipoles from said dipole parameter conversion unit;

determining, in a shape information measuring unit, the shape of the object;

storing, in a shape information memory unit, shape information obtained by measurement in said shape information measuring unit;

determining, in an electromagnetic field distribution calculation unit, an electromagnetic field distribution based on the number, positions and moments of dipoles input from said dipole parameter memory unit and the shape information;

displaying, on a dipole parameter display unit, the number, positions and moments of dipoles; and inputting, in a dipole parameter correction unit, the number, positions and moments of dipoles from said dipole parameter memory unit, the calculated magnetic field distribution value from said electromagnetic field distribution calculation unit and the measured electromagnetic field distribution value from said electromagnetic field distribution measuring unit, and correcting the number, positions and moments of dipoles to reduce a difference between the calculated and measured values of the electromagnetic field distribution.

5. An apparatus for detecting dipole parameters by carrying out a learning operation of a neural network having at least an input layer composed of plural input nodes, an output layer composed of plural output nodes, and one or more hidden layers composed of plural hidden nodes, said input nodes, said hidden nodes and said output nodes being operatively coupled with each other using a plurality of connection weights, comprising:

means for sensing an electromagnetic field distribution imparted by an object while being subjected to an electromagnetic field;

means for storing training data in a memory, said training data including a number of dipoles, positions of the dipoles and moments of the dipoles and an electromagnetic field distribution generated by the dipoles;

means for inputting the sensed electromagnetic field distribution of the object into the neural network;

means for storing said sensed electromagnetic field distribution in the memory;

means for sensing a shape of the object and storing the shape in a shape information memory;

means for applying said training data to the node of said neural network, said neural network outputting training output data at the input node of the neural network corresponding to said training data;

means for determining a first difference between said training data and said training output data;

means for changing said connection weights so that said first difference is less than a first predetermined reference value and storing said changed connection weights in a weight memory unit;

means for applying said sensed electromagnetic field distribution to the input node of said neural network, said neural network outputting sensed output data at the output node of the neural network corresponding to predicted dipole parameters of said sensed electromagnetic field distribution;

means for calculating an electromagnetic field distribution based on the dipole parameters of the sensed output data;

means for determining a second difference between said sensed electromagnetic field distribution and said calculated electromagnetic field distribution;

means for changing the dipole parameters of the sensed output data so that said second difference is less than a second predetermined reference value; and means for displaying the dipole parameters as dipole parameters of the object on a dipole parameter display unit.

* * * * *